United States Patent [19]
Evans

[11] Patent Number: 5,326,432
[45] Date of Patent: Jul. 5, 1994

[54] METHOD OF PRODUCING MAGNESIUM CHLORIDE HEXAHYDRATE AND OTHER ALKALINE EARTH SALTS

[76] Inventor: Bryan D. Evans, 7160 Mize Rd., Shawnee Mission, Kans. 66227

[21] Appl. No.: 925,915

[22] Filed: Aug. 7, 1992

[51] Int. Cl.$^5$ ............................ B01D 1/14; C01F 5/30
[52] U.S. Cl. .................................. 159/47.1; 159/16.1; 159/DIG. 3; 423/155; 423/395; 423/497
[58] Field of Search ................. 159/47.1, 48.1, 16.1, 159/DIG. 15, DIG. 3; 423/395, 497, 498, 155; 34/57 A, 57 R

[56] References Cited

U.S. PATENT DOCUMENTS

| | | | |
|---|---|---|---|
| 1,874,735 | 8/1932 | Barstow et al. | 423/497 |
| 2,671,009 | 3/1954 | Comstock | 159/DIG. 3 |
| 2,857,244 | 10/1958 | Graves | 423/497 |
| 3,346,333 | 10/1967 | Nadler | 159/DIG. 3 |
| 3,836,627 | 9/1974 | Wiensz | 423/169 |
| 3,849,233 | 11/1974 | Lykov | 159/48.1 |
| 3,989,472 | 11/1976 | Braithwaite et al. | 159/48.1 |
| 4,056,599 | 11/1977 | Fox et al. | 423/497 |
| 4,117,078 | 9/1978 | Kunze | 423/163 |
| 4,341,752 | 7/1982 | Groenhof | 423/497 |

OTHER PUBLICATIONS

Ullmann's Encyclopedia of Industrial Chemistry; vol. A1–A28; pp. 597–604, 561 622–624, 265.
Ullmann's Encyclopedia of Industrial Chemistry; vol. A10; pp. 323–325, vol. A2, pp. 2431 vol. A4, pp. 547–552.

*Primary Examiner*—Wilbur Bascomb, Jr.
*Attorney, Agent, or Firm*—Hovey, Williams, Timmons & Collins

[57] ABSTRACT

A low-cost, fluidized-bed drying process for the production of solidified alkaline earth salts is provided which is especially useful for the production of $MgCl_2 \cdot 6H_2O$ from a starting brine nominally containing $MgCl_2 \cdot 12H_2O$. The process includes the steps of passing the starting brine into a drying chamber (12) and fluidizing the brine by contact with hot air for a period of from about 1–15 minutes while heating the brine to a maximum temperature of from about 200°–275° F. This creates a molten salt product, which can then be cooled using ambient air to yield the desired final product. Preferably, the brine is heated to a temperature of from about 230°–250° F., and is subjected to fluidizing contact with hot air for about 5–8 minutes. Ambient air cooling is accomplished by contacting the intermediate melt with ambient air for a period of from about 10 seconds to 3 minutes.

16 Claims, 1 Drawing Sheet

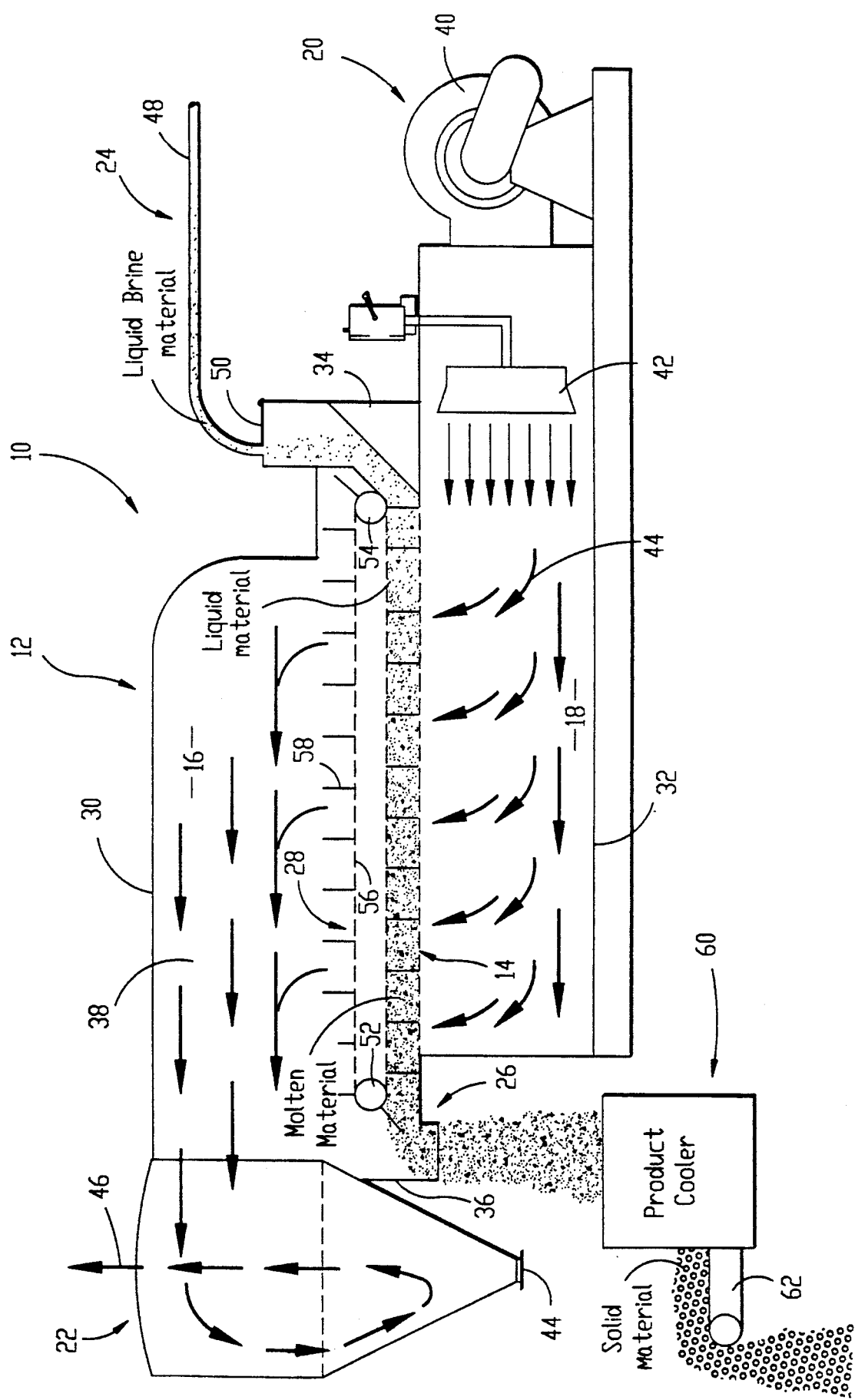

METHOD OF PRODUCING MAGNESIUM CHLORIDE HEXAHYDRATE AND OTHER ALKALINE EARTH SALTS

BACKGROUND OF THE INVENTION

1. Field of the Invention

The present invention is broadly concerned with a low cost process for the production of solidified alkaline earth salts from starting liquid brines containing the relevant salts. The method is particularly adapted for the production of magnesium chloride hexahydrate ($MgCl_2.6H_2O$, also known as bischofite), although other salts such as calcium chloride, calcium nitrate and magnesium nitrate may also be prepared. The invention contemplates production of salts of this type by feeding a brine into a fluidized bed drying chamber in order to dehydrate the brine using a relatively short time fluidizing step.

2. Description of the Prior Art

Magnesium chloride hexahydrate is used primarily in the production of magnesium metal and as a gauging solution for the production of oxychloride cements for flooring, plaster, fire-resistant panels, fire proofing of steel beams, and grinding wheels; it also has a significant use as a road deicer. Magnesium chloride is also used as a fire proofing agent for wood, as a dust binder on roads and in mines, in sugar-beet processing, textiles, water treatment, and as a fire extinguishing agent. Although magnesium chloride forms hydrates with 2, 4, 6, 8 and 12 molecules of water, the hexahydrate and 12-hydrated form are of primary commercial importance. Magnesium chloride is a main constituent of sea water and is found in most natural brines and evaporite deposits. It occurs in scattered deposits as the mineral bischofite and in large commercial deposits as the mineral carnallite.

A number of methods have been followed in the past for the production of magnesium chloride hexahydrate. One of the most common techniques involves the evaporation of sea water and natural brines, but this has heretofore only been economical where the dilute solutions can be preconcentrated by solar evaporation. In one specific example of this process, brine from the Great Salt Lake containing approximately 35% by weight $MgCl_2$ solution (nominally $MgCl_2 \cdot 12H_2O$) is first subjected to solar evaporation, followed by vacuum evaporation until the 6-hydrated form of $MgCl_2$ and $MgSO_4$ are precipitated. Thereafter, the precipitated crystals are heated to 120°-150° C. to redissolve the $MgCl_2 \cdot 6H_2O$ and allow removal of magnesium sulfate. The $MgCl_2.6H_2O$ can then be crystallized out. Alternately, the initially evaporated solution can be maintained at 120° C. until the magnesium sulfate content decreases to less than 20 g/L as a result of crystallization of kieserite. The $MgCl_2.6H_2O$ is then crystallized by vacuum evaporation at 90° C.

The prime difficulty with evaporative processes of this type stems from the high energy input and hence costs associated with the ultimate production of $MgCl_2.6H_2O$. Indeed, the cost of brine dehydration is by far the most significant expense associated with production of the desired product.

It has also been known to manufacture magnesium chloride as a by-product of the potash industry or by direct chlorination of magnesium oxide in the presence of an organic reducing agent. However, these methods are generally even more expensive than those involving evaporation of brines.

In a similar fashion, salts such as calcium chloride have been produced in commercial quantities by a number of processes including the refining of natural brines, reaction of calcium hydroxide with ammonium chloride in Solvay soda ash production, and the reaction of hydrochloric acid with calcium carbonate. Here again, the brine processes are relatively expensive, and involve multiple steps such as reaction of the brines with lime and subsequent concentration.

There is therefore a need in the art for a simplified, low cost process for the production of alkaline earth metal salts, and particularly $MgCl_26H_2O$, which avoids multiple, energy-intensive evaporation and/or chemical separation steps.

SUMMARY OF THE INVENTION

The present invention overcomes the problems outlined above, and provides a greatly improved process for the production of solidified alkaline earth metal salts from starting brines containing such salts (either in the form ultimately desired or as a higher hydrate thereof). The method involves first passing the brine as a liquid into a drying chamber and fluidizing the liquid brine in the chamber by contacting the brine with hot air for a period of from about 1-15 minutes while heating the fluidized brine therein to a maximum temperature of from about 200°-275° F. This creates a melt of the brine which is then cooled to form the desired solidified salt. The cooled agglomerate may then be processed by grinding to achieve a desired particle size.

In preferred forms of the invention, the contact time between the incoming brine and hot fluidizing air in the drying chamber is from about 3-10 minutes, and more preferably from about 5-8 minutes; moreover, the maximum temperature of the brine in the drying chamber is advantageously from about 210°-260° F., and more preferably from about 230°-250° F. In the case of $MgCl_26H_2O$ production, the incoming brine, such as that derived from the Great Salt Lake, contains a substantial portion of higher hydrated forms of $MgCl_2$, nominally $MgCl_2.12H_2O$.

In the preferred cooling step, the molten salts are contacted with cooling air for a period of from about 10 seconds to 3 minutes to form the final solidified salt. More preferably, the cooling air is ambient temperature, and the cooling air contact time is from about 20 seconds to 2 minutes. Most preferably, the ambient cooling air should have a temperature of from about 65°-85° F., and the cooling air contact time should be from about 30 seconds to 1 minute.

Commercially available fluidized bed dryers can be used to good effect in the invention. Generally speaking, in such devices, a perforated screen is provided which receives an incoming feed to be dried. A burner and high-output fan are situated below the screen, and are adapted to generate relatively high pressure hot air streams which pass upwardly through the perforated screen in order to fluidize the incoming material to be dried. Thus, it will be understood that the preferred drying technique involves directing the liquid brine onto a perforated screen within a fluidized bed drying chamber, while simultaneously passing hot air upwardly through the screen for fluidizing contact with the brine. The fluidizing air at the region of the perforated screen should be at a pressure of from about 5-15 in. $H_2O$, and more preferably about 8-12 in.

As indicated previously, a number of alkaline-earth metal salts can be produced by the method of the invention. Accordingly, the methods of the invention are admirably suited for the treatment of Great Salt Lake brine solutions described previously, in order to produce $MgCl_2.6H_2O$.

BRIEF DESCRIPTION OF THE DRAWING

The single Figure is a schematic representation of fluidized bed drying apparatus useful for the practice of the present invention.

DETAILED DESCRIPTION OF THE PREFERRED EMBODIMENTS

Turning now to the drawing, the single Figure depicts a drying apparatus 10 which can be used to good effect for the treatment of incoming brine solutions in accordance with the invention. The depicted dryer 10 is a modified form of a commercially available "JET-PRO" dryer manufactured by the Jet-Pro Company of Springfield, Ohio.

The dryer 10 broadly includes a drying chamber 12 equipped with a stationary, horizontally extending screen 14 as well as upper and lower plenums 16, 18 respectively disposed on opposite sides of the screen 14. An assembly 20 is provided for delivery of high pressure hot air into lower plenum 18, whereas a cyclone 22 is located adjacent the outlet end of the chamber in communication with plenum 16. An inlet 24 is located in communication with the chamber 12, whereas an outlet 26 is provided near the opposite end of stationary screen 14. An endless paddle belt 28 is located within the chamber 12 proximal to the screen 14, for the purpose of conveying product to be dried along the length of the screen from inlet 24 to outlet 26.

In more detail, it will be seen that the chamber 12 includes an upper wall 30, lower wall 32, front wall 34, rear wall 36, and a pair of spaced sidewalls 38. Screen 14 is a stationary member typically having openings therein of from about $\frac{1}{8}$-$\frac{3}{4}$ square inches. As illustrated, the screen 14 effectively divides chamber 12 into the upper and lower plenum regions 16, 18.

The air assembly 20 includes a high-capacity cooling air fan 40 in communication with lower plenum region 18. Fan 40 normally has a capacity of 12,000-18,000 cfm. In addition, a gas-fired burner 42 is situated within the lower plenum region 18 for heating the air fed into the chamber 12 via fan 40. As illustrated by the arrows 44, hot, relatively high pressure air is directed by the assembly 20 upwardly through the openings of screen 14, during operation of the dryer 10.

The cyclone 22 is in and of itself entirely conventional, and is mounted adjacent rear wall 36 in communication with upper plenum region 16. The cyclone 22 is operable for removing dirt and other debris from the exiting air via lower outlet 44; cleaned, relatively cool air currents 46 exit the top of cyclone 22 as illustrated.

The inlet 24 in the embodiment illustrated includes a pipe 48 adapted to convey a liquid product into the throat or chute of the dryer above screen 14. In addition, an hingedly mounted access door 50 covers the remaining open area of the inlet throat, and permits introduction of molten salt material for cooling purposes as will be described. In commercial operation, the pipe 48 would be coupled to a supply of brine and a pump (not shown) would be interposed in the pipe for delivery of the brine into dryer 10.

Outlet 26 is situated adjacent rear wall 36 and serves to deliver product heated in the chamber 12.

The paddle belt 28 is mounted on a pair of spaced sprockets 52, 54. The belt 28 is in the form of a continuous inner belt 56 having a plurality of outwardly extending paddle elements 58 secured thereto. As those skilled in the art will readily appreciate, the belt 28 is driven in an endless fashion so as to move the paddle elements 58 from right to left along screen 14. In this fashion, product to be dried is conveyed along the screen 14 toward outlet 26.

The overall apparatus for practicing the invention further includes a product cooler 60 having an outlet schematically referred to at 62 for cooled product. In the practice of the invention, the dryer 10 can be used for both drying and cooling purposes. In this operation, the incoming brine is first dried using hot air and passes from the outlet 26 as a viscous melt. This melt can then be collected and fed back through access door 50 for cooling operations. During cooling, the burner 42 is shut off, so that ambient temperature air is fed through the chamber 12 in order to rapidly cool the melt. Alternately, the cooler may be a separate unit fed with ambient cooling air, or more simply an extension of the dryer itself having a secondary cooling air source and a downstream cooling chamber.

The following example illustrates the practice of the present invention using a JET-PRO dryer of the type described above. It is to be understood that the example is presented by way of illustration only, and nothing therein should be taken as a limitation upon the overall scope of the invention.

EXAMPLE

One hundred and ten gallons of brine solution (Great Salt Lake Minerals) was dried using the modified JET-PRO dryer illustrated in the Figure. The brine contained about 30% by weight of magnesium chloride salt, nominally $MgCl_2.12H_2O$, and about 10% by weight water. The impurity level was negligible, less than 1% by weight.

The process generally involved feeding the starting brine via the inlet pipe 48 into the drying chamber 12 of the JET-PRO. Hot air was simultaneously passed upwardly through the stationary, perforated screen 14 (having $\frac{1}{4}''$ diameter openings spaced $\frac{1}{2}''$ apart) in a sufficient amount and at a sufficient pressure to fluidize the incoming liquid brine and prevent significant passage thereof through screen 14. The fluidization creates agitation within the incoming brine and facilitates the drying process. The endless paddle belt 28 of the dryer was operated to convey the brine towards the product outlet where it emerged as a viscous, lava-like melt. The melt was then collected in tubs and was fed back through the dryer by pouring the melt into the product inlet chute via access door 50. During this operation, the burner 42 was turned off and ambient air was directed upwardly through the stationary screen 14, and the paddle belt speed was increased to decrease the residence time of the melt in the dryer. The resultant solidified product was then collected at the product outlet 26

In one specific run, the molten product temperature measured at a point about three-fourths of the way down the screen between the inlet and the outlet) was 231° F., whereas the internal ambient dryer temperature was 360° F. The average residence or contact time between the hot air and brine was about 5 minutes, and the depth of product on the perforated screen was about 2 inches. Fan speed was 3100 rpm, and the fluidizing air pressure at the belt was about 5-6 in. $H_2O$. During the cooling step, the contact time was about 30 seconds to 1 minute. The final solid product was analyzed and contained 43% $MgCl_2.6H_2O$.

In a second similar run, the following parameters were determined: product temperature, 240° F.; internal ambient dryer temperature, 400° F.; average contact time, 6.5 minutes; depth of product on belt, 2.5 inches; fan speed, 3100 rpm; air pressure at belt, 5-6 in. $H_2O$; average cooling air contact time, 30 seconds to 1 minute; final product, 50.96% $MgCl_2.6H_2O$.

In a final two tests similar to the second run, the hot air-brine contact times were lengthened by slowing the paddle belt speed, in other respects the tests were the same as the second run. The measured product temperatures were 250° F. and 260° F. respectively, and the corresponding hot air-brine contact times were 7.2 and 8 minutes.

I claim:

1. A process for producing solidified alkaline earth salts from a starting liquid brine containing such salts, comprising the steps of:

passing said brine into a drying chamber as a liquid;
   fluidizing said liquid brine in said chamber by directly contacting said liquid brine in the chamber with upwardly flowing hot air for a period of from about 1-15 minutes, and heating the fluidized brine therein to a maximum temperature of from about 200°-275° F.,
   the maximum temperature of said brine in said drying chamber being from about 200°-275° F.; and
   cooling said heated brine to form said solidified salts.

2. The method of claim 1, said contact time being from about 3-10 minutes.

3. The method of claim 2, said contact time being from about 5-8 minutes.

4. The method of claim 1, said maximum temperature being from about 210°-260° F.

5. The method of claim 1, said maximum temperature being from about 230°-250° F.

6. The method of claim 1, said brine containing $MgCl_2.12H_2O$, said solidified salts comprising $MgCl_2.6H_2O$.

7. The method of claim 1, including the step of contacting said heated brine with cooling air for a period of from about 10 seconds to 3 minutes to form said solidified salts.

8. The method of claim 7, said cooling air being ambient temperature air, and said time being from about 20 seconds to 2 minutes.

9. The method of claim 8, said ambient cooling air having a temperature of from about 65°-8° F., and said time being from about 30 seconds to 1 minute.

10. The method of claim 1, including the steps of directing said brine onto a perforated screen within said chamber, and simultaneously passing said hot air upwardly through said screen for fluidizing contact with the brine.

11. The method of claim 10, said hot air contacting said brine being at a pressure of from about 5-15 in $H_2O$.

12. The method of claim 10, said screen having openings therein of from about $\frac{1}{8}$-$\frac{3}{4}$ square inches.

13. The method of claim 1, said brine having a salt content from about 20-50% by weight.

14. The method of claim 1, said brine being a solution.

15. A process for producing solidified alkaline earth salts from a starting brine containing such salts, comprising the steps of:

passing said brine into a drying chamber;
   fluidizing said brine in said chamber by contacting said brine in the chamber with hot air for a period of from about 1-15 minutes, and heating the fluidized brine therein to a maximum temperature of from about 200°-275° F.; and
   cooling said heated brine to form said solidified salts, including the step of contacting said heated brine with cooling air for a period of from about 10 seconds to 3 minutes to form said solidified salts.

16. A process for producing solidified alkaline earth salts from a starting brine containing such salts, comprising the steps of:

passing said brine into a drying chamber;
   fluidizing said brine in said chamber by contacting said brine in the chamber with hot air for a period of from about 1-15 minutes, and heating the fluidized brine therein to a maximum temperature of from about 200°-275° F.; and
   cooling said heated brine to form said solidified salts, said fluidizing step including the steps of directing said brine onto a perforated screen within said chamber, and simultaneously passing said hot air upwardly through said screen for fluidizing contact with the brine,
   said hot air contacting said brine being at a pressure of from about 5-15 in. $H_2O$,
   said screen having openings therein of from about $\frac{1}{8}$-$\frac{3}{4}$ square inches.

* * * * *